United States Patent [19]
Gladden

[11] Patent Number: 5,765,028
[45] Date of Patent: Jun. 9, 1998

[54] METHOD AND APPARATUS FOR PROVIDING NEURAL INTELLIGENCE TO A MAIL QUERY AGENT IN AN ONLINE ANALYTICAL PROCESSING SYSTEM

[75] Inventor: Paul Edward Gladden, Murrieta, Calif.

[73] Assignee: NCR Corporation, Dayton, Ohio

[21] Appl. No.: 646,216

[22] Filed: May 7, 1996

[51] Int. Cl.$^6$ .................................................. G06F 15/16
[52] U.S. Cl. ................................ 395/11; 395/10; 395/21; 707/2; 707/3; 707/10
[58] Field of Search ........................ 395/11, 21, 10, 395/54; 707/2, 3, 10

[56] References Cited

U.S. PATENT DOCUMENTS

| | | | |
|---|---|---|---|
| 4,920,499 | 4/1990 | Skeirik | 395/12 |
| 5,091,852 | 2/1992 | Tsuchida et al. | 707/2 |
| 5,325,303 | 6/1994 | Waltz et al. | 705/404 |
| 5,588,009 | 12/1996 | Will | 371/33 |
| 5,598,584 | 2/1997 | Hass | 395/395 |

OTHER PUBLICATIONS

"The Truth About Olap is Olap a Viable Technology, or Just the Latest Industry Buzzword?", Maurice Frank, DBMS, Aug. 1995, pp. 40–42, 44, 46 and 48.

"How to Evaluate Olap Servers a Comprehensive Checklist for Evaluating the Latest Olap Server Products", Dan Bulos, DBMS, Aug. 1995, pp. 96–100 and 102–104.

"The Future of Information Filtering", Paul Canavese, Sep. 11, 1995, pp. 1–4.

"Is Olap the Answer? Maybe Not, But it Solves Many Old Database Problems", Alan Radding, Computerworld, Dec. 19, 1994, pp. 72–73.

"Beyond Decision Support", Edgar F. Codd, Sharon B. Codd and Clynch T. Salley, Computerworld, Jul. 26, 1993, pp. 87–88.

*Primary Examiner*—Tariq R. Hafiz
*Assistant Examiner*—Romain Jeanty
*Attorney, Agent, or Firm*—Merchant, Gould, Smith, Edell, Welter & Schmidt

[57] ABSTRACT

A neural intelligent mail query agent. The neural intelligent mail query agent includes an online analytical processing system for accessing and analyzing data in at least one database, a query-by-mail system coupled to the online analytical processing system for receiving and processing queries from users for information derived from databases, and a neural network coupled to the remote query-by-mail system for providing learning capabilities in response to the remote mail queries. An expert system provides inference functions and the neural network is trained using a data stream from the databases as it is generated by the received mail queries. The neural network reports intelligence abstracts to the query-by-mail system as well as reports and organizes new rules constructed from the intelligence abstracts and existing rules.

30 Claims, 4 Drawing Sheets

METHOD AND APPARATUS FOR PROVIDING NEURAL INTELLIGENCE TO A MAIL QUERY AGENT IN AN ONLINE ANALYTICAL PROCESSING SYSTEM

BACKGROUND OF THE INVENTION

1. Field of the Invention

This invention relates in general to an online analytical processing system, and more particularly, to an analytical tool kit which combines query-by-mail functions with the learning capability of neural networks.

2. Description of Related Art

Mail-enabled computer applications have received considerable press coverage over the last few years. Mail-enabled applications communicate with people or other applications by sending or receiving data via electronic mail (e-mail).

One way to classify mail-enabled applications is by originator and recipient roles. Application-To-Person are the simplest and most common mail-enabled applications. Application-To-Person mail-enabled applications send a message or file to a person's mailbox. Utilization may include report distribution and alert notices, such as using an application to generate a summary report which is sent to one or more recipients.

Person-To-Application are more complicated since they require more programming expertise to accomplish tasks such as parsing incoming mail from humans. These applications often perform data retrieval and employ an Application-To-Person component to return the results. A Query-By-Mail directory search facilities is one example of such an application. Other possibilities include document or text retrieval, database queries or updates, and file uploads or downloads. For example, an agency could set up a automated mail server that allows users to send requests for government information. The application then would parse the incoming request, find or generate the appropriate information, and send a response document back.

One of the challenges of information processing in the nineties is how to process increasingly larger databases, containing increasingly complex data, without sacrificing response time. The client/server architecture gives organizations the opportunity to deploy specialized servers which are optimized for handling specific data management problems. One of the major concerns for any enterprise is how to ensure that data remains integrated and accessible to a wide variety of servers.

Until recently, organizations have tried to use relational database management systems (RDBMSs) for the complete spectrum of database applications. However, it is becoming increasingly apparent that there are major categories of database applications which are not suitably serviced by relational database systems. For example, RDBMSs do not service ad hoc data access and analysis well, especially in a multiple vendor or multiple site environment. As a result, there is usually a need for a "stand-off" analysis tool.

One such tool is known in the art as on-line analytical processing (OLAP). OLAP describes a class of technologies that are designed for the above-identified ad hoc data access and analysis. OLAP applications have query and response time characteristics which set them apart from traditional on-line transaction processing (OLTP) applications. Specialized OLAP servers are designed to give analysts the response time and functional capabilities of sophisticated personal computer programs with the multi-user and large database support they require.

While transaction processing generally relies solely on relational databases, OLAP has become synonymous with multidimensional views of business data. These multidimensional views are supported by multidimensional database technology. Further, these multidimensional views provide the technical basis for the calculations and analysis required by Business Intelligence applications.

The essence of OLAP server technology is fast, flexible data summarization and analysis. While SQL databases will most likely continue to dominate on-line transaction processing (by necessity a record-by-record process), OLAP servers are a superior technology for Business Intelligence applications. Efficient and flexible data analysis requires the ability to summarize data in multiple ways and view trends over time. OLAP servers and relational databases may work in harmony to create a server environment that can deliver data to users quickly and allow them to perform the analysis needed to make the best business decisions.

Accordingly, on-line analytical processing (OLAP) applications are rapidly increasing in popularity as organizations attempt to maximize the business value of the data that is available in ever increasing volumes from operational systems, spreadsheets, external databases and business partners. Throughout modern organizations, decisions are constantly being made about pricing, the deployment of resources, the choice of suppliers and where and when future investment should be made. In the past, these decisions have often been made based on intuition and experience rather than solid data, analyses and tested hypotheses. With the downsizing of management structures, as well as re-engineered businesses and globalization, the need for better analysis tools is greater than ever.

Nevertheless, simply viewing this data is not sufficient. Business value comes from using it to make better informed decisions more quickly, and creating more realistic business plans. Further, OLAP application requirements consist of much more than just viewing history with different levels of aggregation. Many new calculations are needed, some quite complex. For example, profitability figures by product, customer and market may be needed to support investment and pricing decisions throughout an organization. Knowledge workers make decisions based on comparisons and trends. Therefore, it must be possible to calculate ratios or percentage differences between any measure of the business and view it from any perspective of the business (e.g. over time, actual versus budget, retail versus wholesale). It must also be possible to build business models for the future which make use of the detailed historical data available, and enable interactive changes to the planning assumptions and calculation formulae. The purpose of OLAP is often to make decisions about the future, not simply to review the past. Nevertheless, due to the large volumes of data inherent to such systems and as a result of multiple storage schemes being required, the development of business models and formulas are a monumental tasks in themselves.

Artificial neural networks (ANN) are networks of many very simple processors, each possibly having at least a small amount of local memory. The units are connected by uni-directional communication channels ("connections"), which carry numeric data, as opposed to symbolic data. The units operate only on their local data and on the inputs they receive via the connections.

The design motivation is what distinguishes neural networks from other mathematical techniques. A neural network is a processing device, whose design was motivated by the design and functioning of the human brain. Neural networks like people, learn by example, typically, a neural network will be configured for a specific application such as pattern recognition or data classification, through a learning process.

Most neural networks have some sort of "training" rule whereby the weights of connections are adjusted on the basis of presented patterns. In other words, neural networks "learn" from examples, just like children learn to recognize dogs from examples of dogs, and exhibit some structural capability for generalization. Neural networks normally have great potential for parallelism, since the computations of the components are independent of each other. In principle, neural networks can compute any computable function, i.e. they can do everything a normal digital computer can do. In particular, anything that can be represented as a mapping between vector spaces can be approximated to arbitrary precision by neural networks.

In practice, neural networks are especially useful for mapping problems which are tolerant of some errors, have lots of example data available, but to which hard and fast rules can not easily be applied. Still, the most important advantages of neural networks is in solving problems that are too complex for conventional solutions such as found where a problem does not have an algorithmic solution or where an algorithmic solution is too complex to be form. Consequently, neural networks are well-suited for problems people generally are good at solving, but which computers are not well adapted for.

Thus, it can be seen then that there is a need for an online analytical processing system which combines remote query-by-mail functions with the learning capabilities afforded by multilevel neural networks.

SUMMARY OF THE INVENTION

To overcome the limitations in the prior art described above, and to overcome other limitations that will become apparent upon reading and understanding the present specification, the present invention discloses a neural intelligent mail query agent.

The present invention solves the above-described problems by providing an online analytical processing toolkit with query-by-mail functionality and neural network learning capabilities.

A system in accordance with the principles of the present invention includes an online analytical processing system for accessing and analyzing data in at least one database, a query-by-mail system coupled to the online analytical processing system for receiving and processing queries for information derived from databases from local or remote users, and a neural network coupled to the remote query-by-mail system for providing learning capabilities in response to the remote mail queries.

One aspect of the present invention is that an expert system provides inference functions.

Another aspect of the present invention is that the neural network is trained using a data stream from the databases, and wherein the data stream is generated by the received mail queries.

Another aspect of the present invention is that the query-by-mail system may process one-time queries, accept business rule definitions for transfer into the neural net, and monitor events.

Another aspect of the present invention is that the query-by-mail system may perform batch queries for off-peak processing, perform query scheduling and reporting, and maintain query histories for notification of the neural network.

Yet another aspect of the present invention is that the query-by-mail system may report query histories to the neural network based upon past queries and report activity.

Still another aspect of the present invention is that the query-by-mail system may provide universal registration for all the learning by the neural network and executes query and report filters for ensuring queries executed upon the databases are blind courtesy copied to the user.

Another aspect of the present invention is that the the neural network derives business rules from query-by-mail input using information from a expert system.

Another aspect of the present invention is that the the neural network reports intelligence abstracts to the query-by-mail system as well as reports and organizes new rules constructed from the intelligence abstracts and existing rules.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an online analytical processing system with query-by-mail functionality and neural network learning capabilities.

Figure 1:
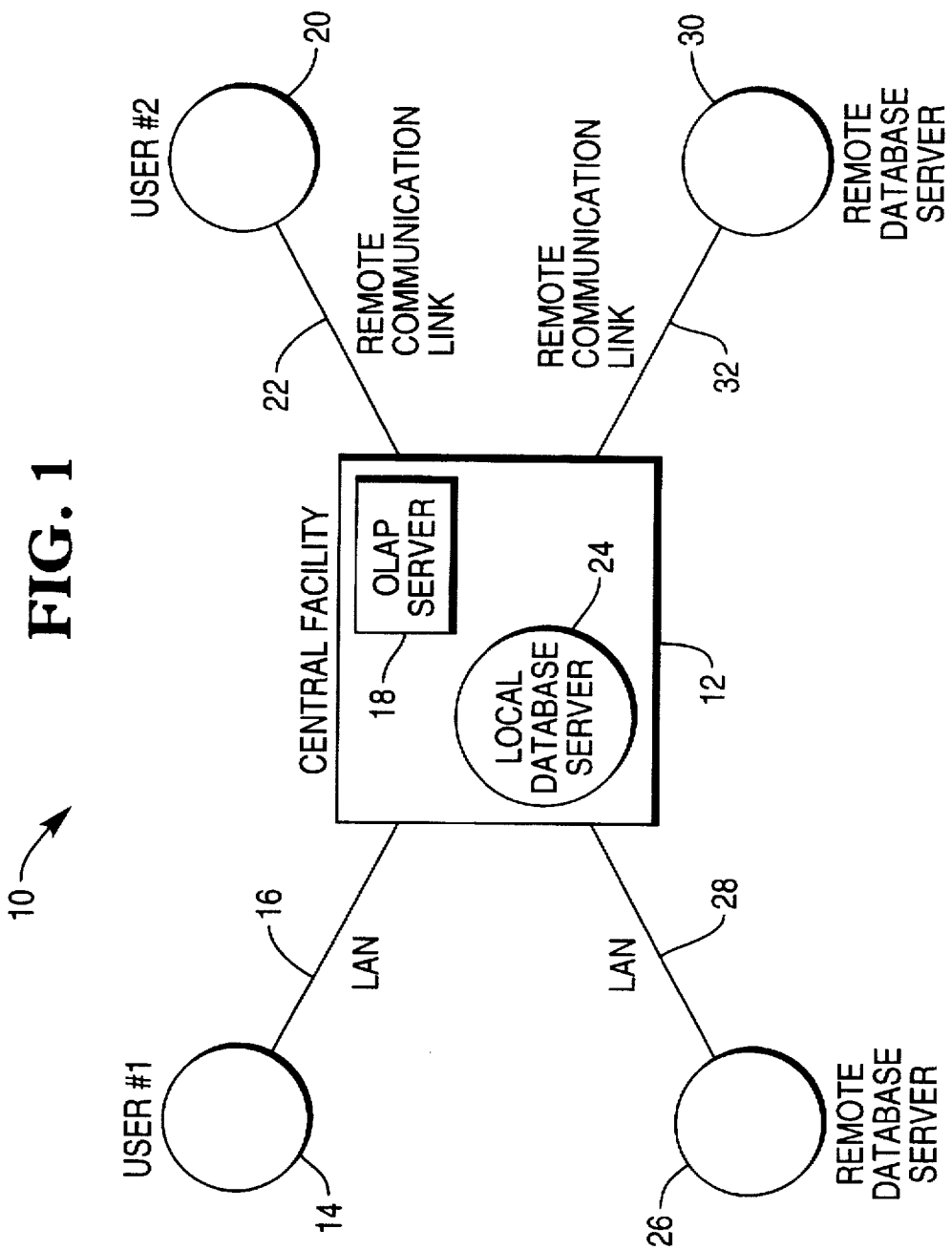
FIG. 1 illustrates an system block diagram of a neural intelligent mail query agent according to the present invention.

FIG. 1 illustrates an online analytical process system 10 according to the present invention wherein a central facility 12 serves a user 14 as communicating with the central facility 12 over a communication link 16 in order access the online analytical process system 18. Communication link 16 may be over a local area network connecting a multitude of users. A second user 20 may be connected by a remote communication link 22 either via telephone or over another network such as the Internet. The online analytical processing (OLAP) system 18 may have a database connected directly at the central facility 24 or it may access a remote database 26 over a LAN 28. Further, the OLAP system 18 may also access data at a remote database server 30 using another remote communication link such as Internet 32.

Figure 2:
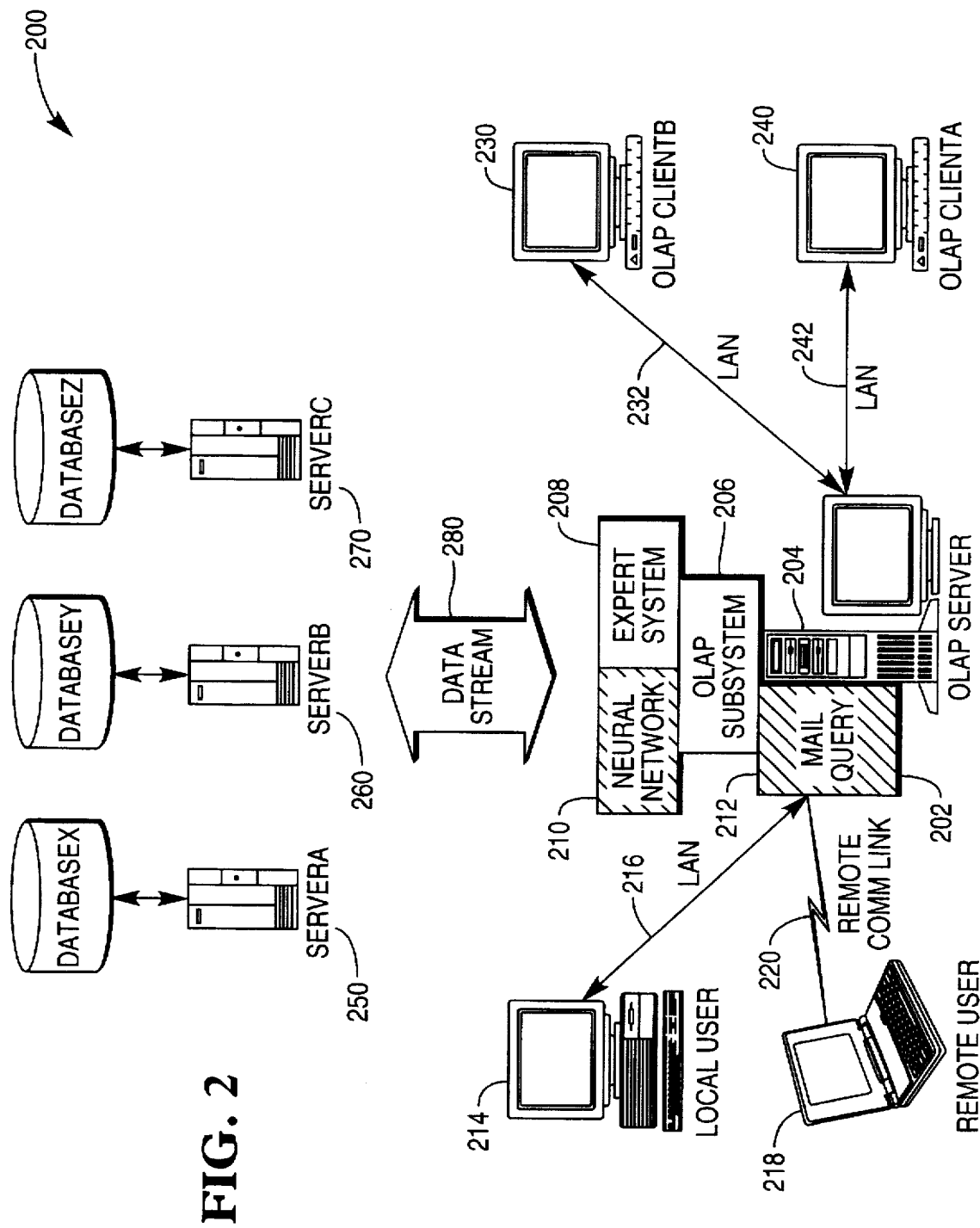
FIG. 2 illustrates a detailed block diagram of a neural intelligent mail query agent combining an online analytic process system with a query-by-mail system and a neural network according to the present invention.

FIG. 2 illustrates a detailed block diagram of an online analytic process system 200 according to the present invention. The online analytical process system 200 includes an online analytical process server 202 consisting of a computer and display 204 which supports the online analytical processing subsystem 206 and expert system 208 which provides inference engines. A neural network 210 may be coupled to the online analytical processing subsystem 206 to provide intelligence to learn from queries which may be accepted by the mail query system 212. Thus a local user 214 may access the online analytical processing server 202 via lan 216 or a remote user 218 may communicate with the mail query system using a remote communication link 220. The online analytical processing server 202 may communicate with different online analytical processing clients 230, 240 at remote locations via LAN connections 232, 242. The online analytical processing server 202 may access a multitude of database servers 250, 260, 270 which provide the data stream 280 to the online analytical server 202.

The neural network 210 is trained using the data stream (resultant) generated by mail queries 212 received from local 214 and remote 218 users. The mail queries and subject matter expertise (SME) define the "business rules" for training the network. The neural network 210 is excellent for discovering patterns not perceivable through conventional methods. The sequential and logical reasoning offered by the expert systems (inference engine) 208, and the self-organizing, learning, response, and abstraction offered by the neural network 210 unleashed into voluminous corporate data contained in the multitude of database servers 250, 260, 270 combined with universal access through query-by-mail system 212 supports decision support activities on a scale not attainable through conventional OLAP processing schemes. Thus, the invention affords common access through electronic forms manipulation or direct SQL query embedded in the message body, and remote event monitoring/processing by the intelligent query-by-mail agent 212.

Figure 3:
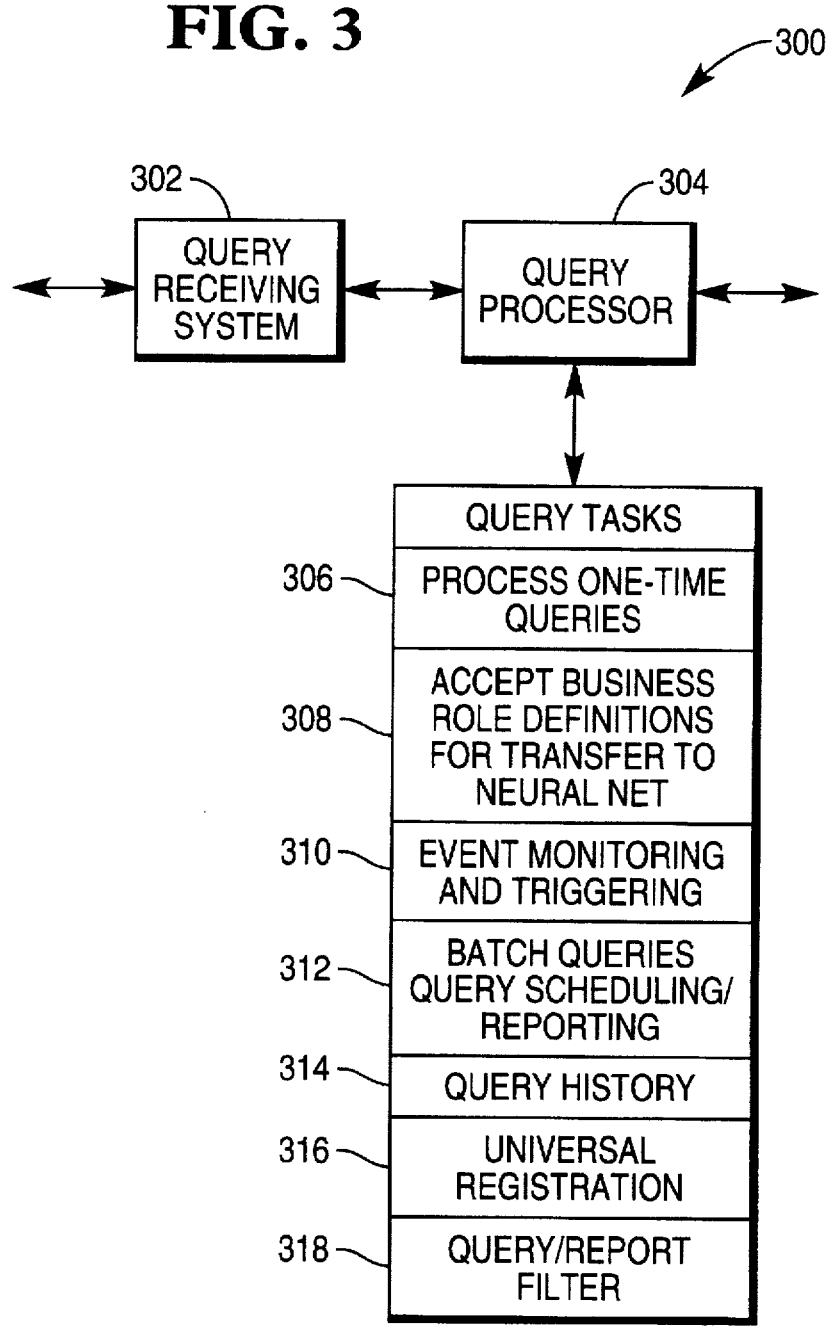
FIG. 3 illustrates the query-by-mail system according to the present invention.

FIG. 3 illustrates the query-by-mail system 300 according to the present invention. The query-by-mail agent 300 will receive input 302 in the form of electronic mail queries for data. The electronic mail queries are processed 304. The query-by-mail intelligent agent 300 would process one-time queries 306, accept "business rule" definitions for transfer into the neural net 308, provide asynchronous event monitoring and triggering an event when a conditional occurs 310, batch queries for off-peak processing, perform query scheduling/reporting (hourly, daily, weekly, quarterly, etc.) 312, maintain query history (per user) for asynchronous notification of the neural network reporting based upon a users past query/report activity 314, provide universal registration for all the learning by the neural network (e.g. give me everything learned) 316, and execute query/report filters which ensure that queries executed upon localized data set are "blind courtesy copied" (BBC) to registrant 318. However, those skilled in the art will recognize that the query-by-mail system is not meant to be limited to accomplishing only the tasks outlined herein. The query tasks discussed herein are merely provided as exemplary query tasks which may be performed according to the present invention.

Figure 4:
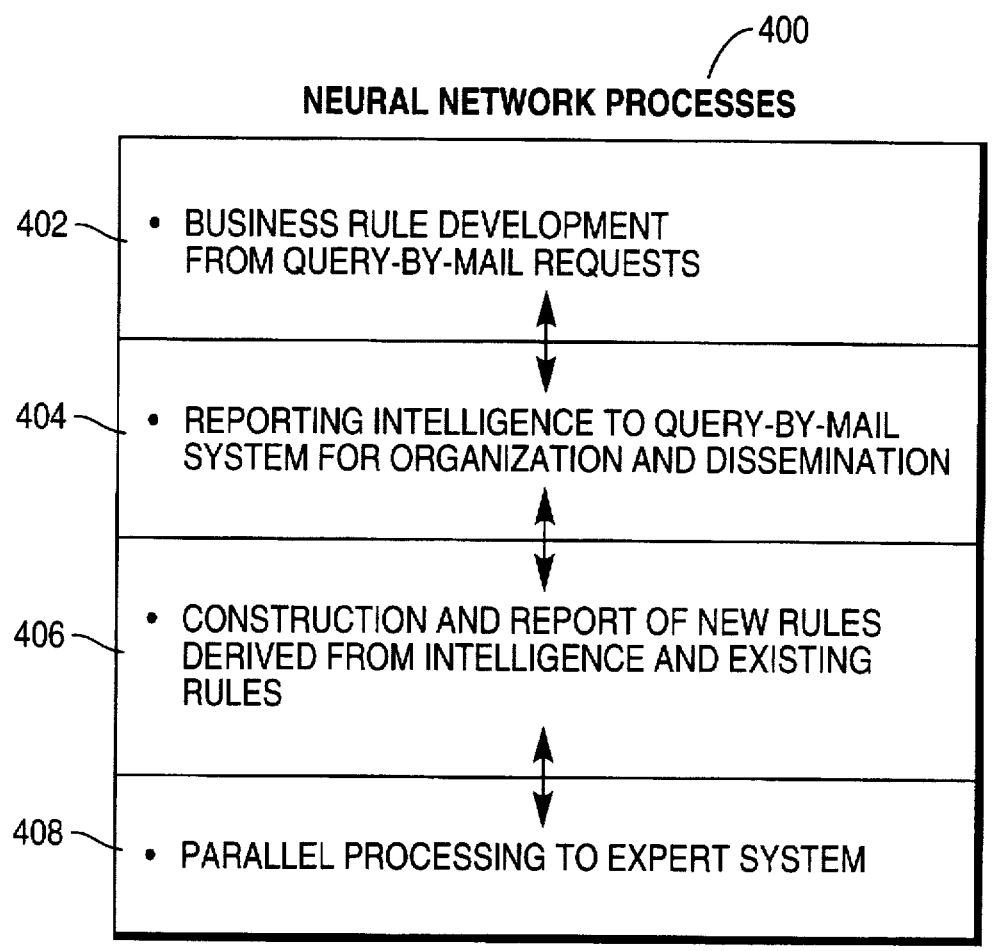
FIG. 4 illustrates exemplary process elements that may be performed by the neural network according to the present invention.

FIG. 4 illustrates the process elements performed by the neural network 400. The neural network 400 would derive "business rules" from query-by-mail input 402, report learning to query-by-mail subsystem for organization and dissemination 404, and report new rules constructed from derived intelligence abstracts and existing rules 406. In addition, the neural network would act in parallel to any existing expert system (ES) 408. However, those skilled in the art will recognize that the neural network processes listed herein are provided for illustration only, and that the present invention may perform other neural network processes without departing from the scope of the present invention.

In summary, ever increasingly complex and voluminous business data may be more effectively used to develop business models and formulae by local and remotely located employees using the capabilities of an online analytical processing system that combines query-by-mail functionality with the learning capabilities of neural networks.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A neural intelligent mail query agent, comprising;
   an online analytical processing system for accessing and analyzing data in at least one database;
   a query-by-mail system, coupled to the online analytical processing system, for receiving and processing queries from at least one user for information derived from the at least one database; and
   a neural network, coupled to a remote query-by-mail system, for providing learning capabilities in response to the queries.

2. The neural intelligent mail query agent of claim 1 further comprises a communication link connecting the at least one user to the query-by-mail system.

3. The neural intelligent mail query agent of claim 2 wherein the communication link comprises a local area network connecting the at least one user.

4. The neural intelligent mail query agent of claim 2 wherein the communication link is a remote communications link, the remote communication link comprising a telephone line.

5. The neural intelligent mail query agent of claim 2 wherein the communication link is a remote communications link, the remote communication link comprising an internet connection.

6. The neural intelligent mail query agent of claim 1 wherein the at least one database comprises at least one local database.

7. The neural intelligent mail query agent of claim 1 wherein the at least one database comprises at least one remote database.

8. The neural intelligent mail query agent of claim 1 further comprising a computer and display for supporting the online analytical processing system.

9. The neural intelligent mail query agent of claim 1 further comprising an expert system for providing inference functions.

10. The neural intelligent mail query agent of claim 1 wherein the neural network is trained using a data stream from the at least one database, the data stream being generated by an online analytical processing system client.

11. The neural intelligent mail query agent of claim 1 wherein the neural network is trained using a data stream from the at least one database, the data stream being generated by the received mail queries.

12. The neural intelligent mail query agent of claim 1 wherein the query-by-mail system comprises means for processing one-time queries, means for accepting business rule definitions for transfer into the neural net, and means for monitoring events, an event being triggered when a conditional occurs.

13. The neural intelligent mail query agent of claim 1 wherein the query-by-mail system further comprises means for performing batch queries for off-peak processing, means for performing query scheduling and reporting, and means for maintaining query histories for notification of the neural network.

14. The neural intelligent mail query agent of claim 1 wherein the query-by-mail system further comprises means for reporting query histories to the neural network based upon past queries and report activity.

15. The neural intelligent mail query agent of claim 1 wherein the query-by-mail system further comprises means for providing universal registration for all the learning by the neural network and means for executing query and report filters for ensuring queries executed upon the at least one databases are blind courtesy copied to the user.

16. The neural intelligent mail query agent of claim 1 wherein the neural network further comprises means for deriving business rules from query-by-mail input.

17. The neural intelligent mail query agent of claim 1 wherein the neural network further comprises means for reporting intelligence abstracts to the query-by-mail system and for reporting and organizing new rules constructed from the intelligence abstracts and existing rules.

18. A method for providing remote access to and processing of information contained in large databases without sacrificing response time, comprising the steps of:

receiving and processing queries from at least one user for information derived from the at least one database;

accessing and analyzing data in the at least one database in response to the received queries; and providing learning capabilities using a neural network in response to the queries.

19. The method of claim 18 further comprising the step of connecting the at least one user to the query-by-mail system using a communication link.

20. The method of claim 19 wherein the communication link comprises a local area network connecting the at least one user.

21. The method of claim 19 wherein the communication link is a remote communications link, the remote communication link comprising a telephone line.

22. The method of claim 19 wherein the communication link is a remote communications link, the remote communication link comprising an internet connection.

23. The method of claim 18 further comprising the step of providing inference functions using an expert system.

24. The method of claim 18 wherein the step of providing learning capabilities uses a neural network and comprises the step of training the neural network using a data stream from the at least one databases, the data stream being generated by the received mail queries.

25. The method of claim 18 wherein the receiving and processing queries from at least one user for information derived from the at least one database further comprises the steps of processing one-time queries, accepting business rule definitions for transfer into a neural net, and monitoring events, an event being triggered when a conditional occurs.

26. The method of claim 18 wherein the receiving and processing queries from at least one user for information derived from the at least one database further comprises the steps of performing batch queries for off-peak processing, performing query scheduling and reporting, and maintaining query histories for notification of a neural network.

27. The method of claim 18 wherein the receiving and processing queries from at least one user for information derived from the at least one database further comprises the steps of reporting query histories to a neural network based upon past queries and report activity.

28. The method of claim 18 wherein the receiving and processing queries from at least one user for information derived from the at least one database further comprises the steps of providing universal registration for all learning by a neural network and executing query and report filters for ensuring queries executed upon the at least one databases are blind courtesy copied to the user.

29. The method of claim 18 wherein the receiving and processing queries from at least one user for information derived from the at least one database further comprises the steps of deriving business rules from query-by-mail input.

30. The method of claim 18 wherein the receiving and processing queries from at least one user for information derived from the at least one database further comprises the steps of reporting intelligence abstracts to the query-by-mail system and for reporting and organizing new rules constructed from the intelligence abstracts and existing rules.

* * * * *